(12) United States Patent
Adams et al.

(10) Patent No.: US 8,443,155 B2
(45) Date of Patent: May 14, 2013

(54) LOCK-FREE CONCURRENT OBJECT DICTIONARY

(75) Inventors: Keith Adams, San Carlos, CA (US); Spencer Ahrens, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 755 days.

(21) Appl. No.: 12/651,296

(22) Filed: Dec. 31, 2009

(65) Prior Publication Data
US 2011/0161602 A1     Jun. 30, 2011

(51) Int. Cl.
*G06F 12/00*   (2006.01)
(52) U.S. Cl.
USPC .................... 711/148; 711/E12.032
(58) Field of Classification Search .............. 711/148, 711/E12.032
See application file for complete search history.

(56) References Cited

U.S. PATENT DOCUMENTS
2008/0256073 A1* 10/2008 Detlefs et al. ............... 707/8

OTHER PUBLICATIONS

Donald Knuth, The Art of Computer Programming, vol. 3 Sorting and Searching, pp. 506-519, 1973, Addison Wesley.*

* cited by examiner

*Primary Examiner* — Edward Dudek, Jr.
*Assistant Examiner* — John P Fishburn
(74) *Attorney, Agent, or Firm* — Fenwick & West LLP

(57) ABSTRACT

An object storage system comprises one or more computer processors or threads that can concurrently access a shared memory, the shared memory comprising an array of equally-sized cells. In one embodiment, each cell is of the size used by the processors to represent a pointer, e.g., 64 bits. Using an algorithm performing only one memory write, and using a hardware-provided transactional operation, such as a compare-and-swap instruction, to implement the memory write, concurrent access is safely accommodated in a lock-free manner.

18 Claims, 2 Drawing Sheets

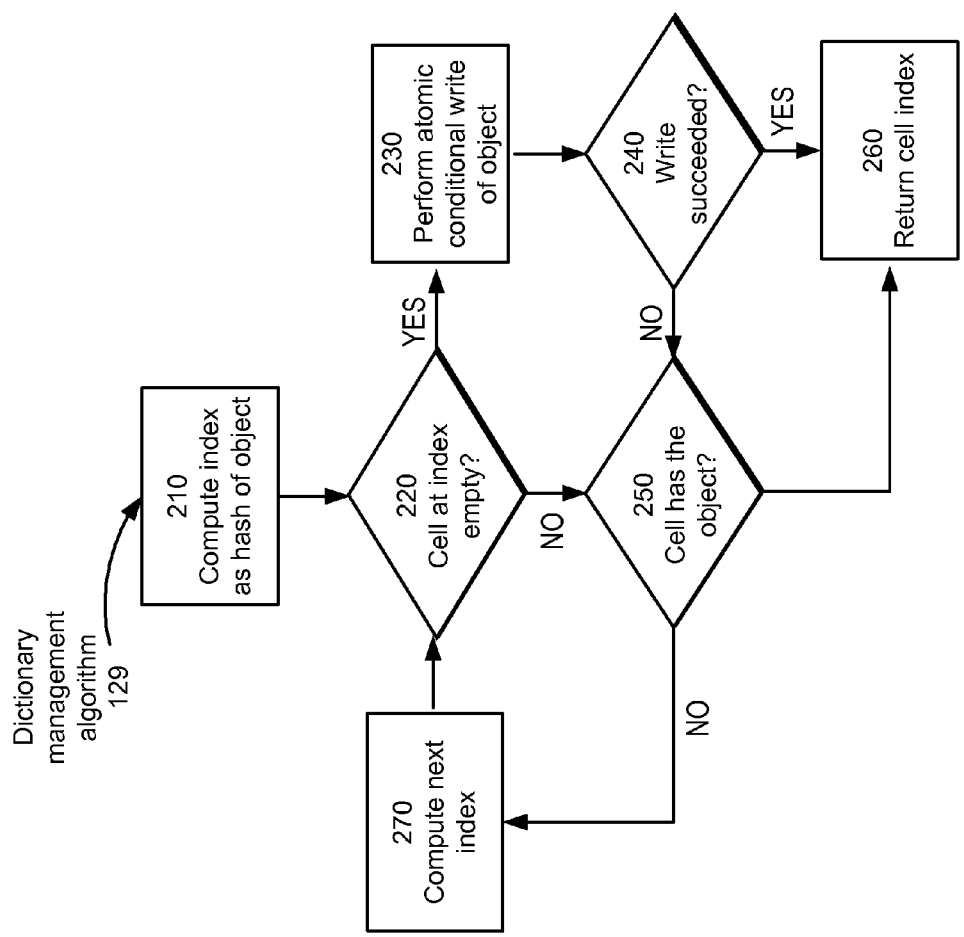

LOCK-FREE CONCURRENT OBJECT DICTIONARY

BACKGROUND

1. Field of Art

The present invention generally relates to the field of computer data storage and retrieval, and more specifically, to efficiently representing a set of objects in an in-memory dictionary.

2. Background of the Invention

Computer systems often represent redundant data. For example, natural language strings in documents, names in user databases, and popular music files on multi-user file systems frequently reoccur in practice. As one concrete example, FACEBOOK's social network has over 350 million users, each of whom has two or more names. These individual names overlap from user to user, with popular names like "John" and "Smith" appearing millions of times. Performance requirements dictate that these names reside in main memory for fast access, which requires very large amounts (e.g., gigabytes) of costly RAM.

To economize storage space for such repetitive data, computer systems often compress redundant data. Compression systems compromise among three competing goals: compactness of representation of a datum, the speed with which an original datum can be recovered from its compressed form, and speed of integrating a new datum into the compressed set.

A lookup table (e.g., a dictionary) is one type of compression technique. A lookup table records each object's value in some form of vector, such as an array, and uses an integer storing the object's index offset into the vector as a short identifier. For the majority of the system's data, the object can then be represented by the integer, thereby achieving a compression ratio for that object of $$(l_{int}/l_{obj})+(1/N)$$

where $l_{int}$ is the length of the integer in bytes, $l_{obj}$ is the length of the object data in bytes, and N is the number of occurrences of the object in the system data.

Where the object is sufficiently large, or where there is a sufficient number of repeated occurrences of objects, the lookup table provides a high degree of compression and enables rapid recovery of the object value, given the integer representing its associated offset into the vector. However, adding a new object to the lookup table is computationally expensive if a linear scan of the table is performed. Conventional solutions address this problem by employing auxiliary data structures to map object values to locations in the lookup table but do so at the expense of reducing the achievable degree of compression. These conventional solutions additionally require multiprocessor synchronization with respect to the auxiliary data structure, which increases the length of time required to obtain the original object from the lookup table.

SUMMARY

An object storage system comprises one or more computer processors or threads that can concurrently access a shared memory, the shared memory comprising an array of memory cells. In one embodiment, each cell has a size used by the processors to represent a pointer, e.g., 64 bits. A dictionary management algorithm is used to access the array for both reading data and storing data therein. The dictionary management algorithm uses only a single memory write step implemented by a hardware-provided atomic conditional write instruction (or an equivalent thereof), such as compare-and-swap, thereby providing concurrent access to multiple processors without the need to acquire locks. Only a single representation of each object—e.g., a pointer to object data stored outside the cells array—is stored in the array, which reduces memory requirements when there are multiple references to a given object, for example, where multiple objects are associated with the same object data. As a further memory savings, in some embodiments if an object is sufficiently small it is stored inline within a cell of the cells array. An object can be specified to client code as an index into the cells array indicating the cell in which the representation of the object is stored, rather than an absolute pointer to the memory location of the cell. The use of index values to identify the external object data requires fewer bits than the length of the pointers, resulting in significant memory savings where the number of instances of such index values is in the order of millions or more, as is common in very large databases.

In one embodiment, an object dictionary is implemented as a linearly-addressed plurality of memory cells operatively coupled with at least one computer processor. Each memory cell stores data representing either an empty state indicating that no object has been stored within the cell, or an allocated state indicating that an object has been stored within the cell. Further, no memory cell representing an allocated state thereafter transitions to representing an empty state. Additionally, all operations causing a memory cell to transition from the empty state to an allocated state are transactional, in that concurrent accesses to the same memory cell by different processors do not result in objects being stored inconsistently (e.g., representations of two different objects being stored in the same cell).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2 is a flowchart according to one embodiment that depicts the actions of a dictionary management algorithm for finding a given object within the object dictionary and adding it to the dictionary if it is not already present.

Figure 1:
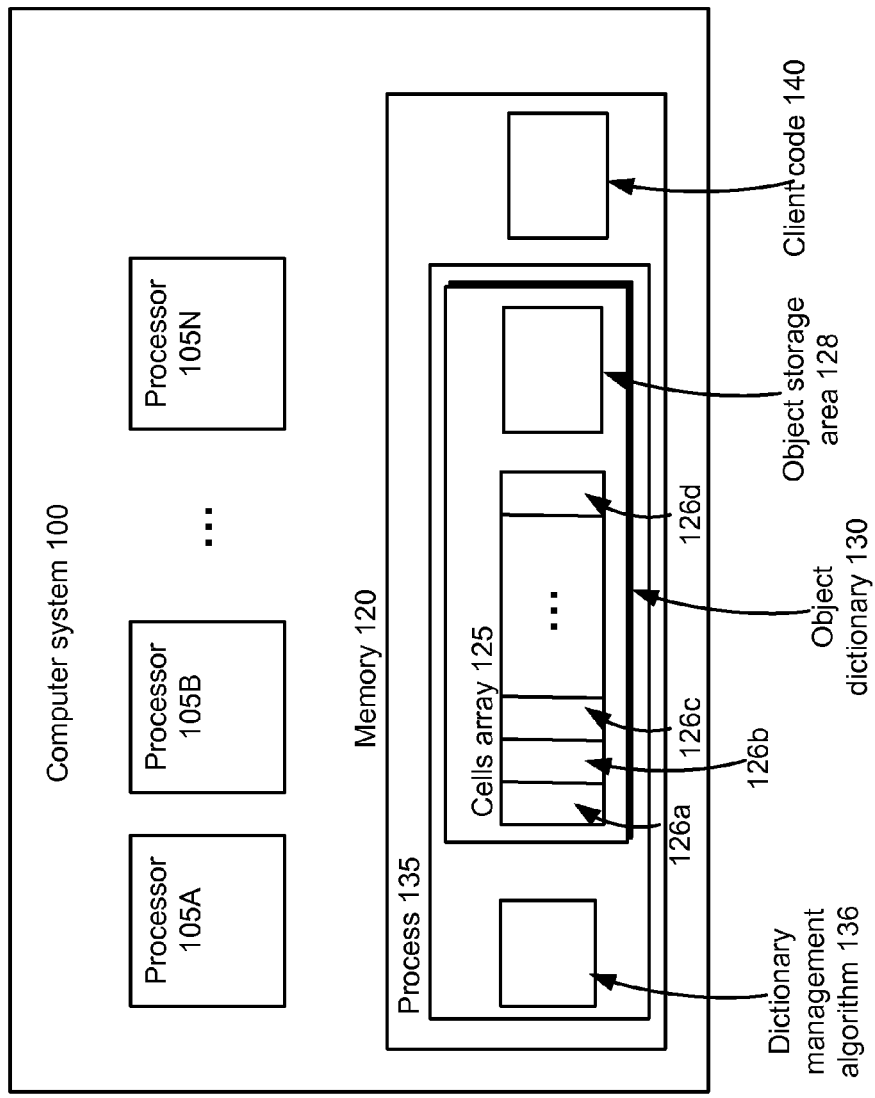
FIG. 1 is a block diagram of a computer system within which an object dictionary is implemented, in accordance with one embodiment of the present invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

FIG. 1 is a block diagram of a computer system 100 within which an object dictionary is implemented, in accordance with one embodiment of the present invention. The computer system 100 as depicted in FIG. 1 has a set of processors 105 that may simultaneously access a memory 120. The term "processor" as used herein broadly refers to any of a multithreaded uniprocessor (or a thread thereof), a single processor within a multiple processor system, a processing core in a multi-core processor, or the equivalent of any of these that may access the memory 120 concurrently with other processors.

The memory 120 is accessible by all processors 105. For example, the memory 120 can be a main, or primary, high speed memory that is accessed via a bus or equivalent high speed interface. Within the memory 120 is a process 135 that allocates a cells array 125 managed by a dictionary management algorithm 136 of the process. The process 135 also allocates an object storage area 128 that stores any object representations not directly stored within the cells array 125. The cells array 125, together with the object storage area 128, implements an object dictionary 130 allowing storage and lookup of objects, and is allocated by the process 135 using conventional memory allocation system calls provided by an operating system run by the system 100. In one embodiment, the cells array 125 comprises a sequential set of memory cells 126, where each memory cell has the same size (in bits) as the size of memory pointers used by the processors 105. For example, if the processors 105 have a 64-bit memory space, then each cell 126 is 64 bits. At any given time, each cell is in one of two possible states: an "empty" state (represented by, e.g., all zero bits) indicating that the cell does not yet reference an object, and an "allocated" state indicating that the cell does reference an object. When the system 100 is initialized, each cell 126 of the cells array 125 is set to the empty state. Each cell may subsequently be set to the allocated state, but once a cell has been set to the allocated state, it never returns to the empty state while the system 100 remains active.

In one embodiment, a cell 126 represents an object by storing a pointer to data for the object, the data being stored in the object storage area 128, external to the cells array 125 itself. In another embodiment, a cell 126 represents an object by storing the object data itself if the object data can be stored within the amount of memory of the cell, and storing a pointer to object data stored in the object storage area 128 otherwise. For example, assume that the cell array 125 serves as a name dictionary, where the object data are name tokens (e.g., first or last names) of individuals, such as "Elizabeth," "Robert," "Sarah," "Christopher," "Brown," "Goudge," "Berquist," "Chesterton," etc. A cell 126 could store an object representation as a pointer to a location in the object storage area 128 where the associated object name token is stored, such as in the case of the longer name tokens (e.g. "Elizabeth," "Christopher," "Berquist," and "Chesterton"), or a cell could store the object name itself, such as in the case of shorter name tokens that fit within the cell (e.g. "Robert," "Sarah," "Brown," and "Goudge").

As noted, the memory 120 also contains the process 135, which is executed by the processors 105 and manages the cells array 125 and implements the object dictionary 130 therein. The process 135 allocates the cells array 125 within the memory 120 and initializes each cell 126 to the "empty" state. The process 135 also includes a dictionary management algorithm 136 that finds a given object within the object dictionary and adds it to the dictionary if it is not already present, the latter involving the transition of a cell 126 from the empty state to an allocated state. The dictionary management algorithm 136 additionally accounts for the possibility of concurrent accesses by different processors when finding and adding objects.

The memory 120 can additionally contain executable client code 140 that uses the object dictionary 130, e.g. requesting the location of a given object within the dictionary, or inserting an object into the dictionary. For example, the client code 140 could include code for a portion of a social networking system that tracks friends of users (e.g., as a source of a message or posting), storing the names of the friends as name tokens within the object dictionary 130.

It is appreciated that the system 100 can additionally contain a number of conventional hardware components not depicted in FIG. 1 in order to simplify the discussion, such as chipsets connected to the processors 105, secondary storage such as hard disks or flash memory, keyboards, displays, graphics adapters, pointing devices, network adapters, and the like.

Note that since the processors can operate in parallel, they may access the cells array 125 at the same time. This concurrent access leads to the danger that the memory cells 126 may end up in an inconsistent state if it is accessed by two or more processors at the same time. The dictionary management algorithm 136 accounts for such concurrency when searching and adding to the object dictionary, as described below.

Dictionary Management Algorithm

FIG. 2 is a flowchart according to one embodiment that depicts the actions of the dictionary management algorithm 136 for finding a given object within the object dictionary and adding it to the dictionary if it is not already present, while accounting for the possibility of concurrent accesses by different processors. As previously noted, the process 135 initializes all cells 126 to begin in the empty state, and cells subsequently transition to the allocated state as objects are stored within the object dictionary 130. The process 135 executes the dictionary management algorithm 136 whenever the client code 140 executing on one of the processors 105 references an object from the object dictionary, such as when storing a new object. The dictionary management algorithm operates automatically, and without user interaction.

At the beginning of the dictionary management algorithm 136, the algorithm computes a hash value of an object being sought in the dictionary, e.g., using any hash function designed to distribute objects uniformly across the cells array 125. The algorithm 136 then sets 210 an index integer representing a given cell within the cells array 125 to the hash value. Then, the algorithm 136 determines 220 whether the cell at this index within the cell array 125 is in the empty state or not. This determination can be made with standard memory read and comparison instructions, without the need for special concurrency control instructions.

If the cell is in fact determined to be in the empty state at step 220, then the algorithm 136 issues 230 an atomic conditional write instruction supported by the processor, such as an atomic compare-and-swap instruction, to conditionally write a representation of the object into the cell as long as the cell is still in the empty state. The atomic conditional write instruction need not be a compare-and-swap instruction, but may instead be an instruction or instructions of equivalent expressive power. Instructions of equivalent expressive power include: the combination of load-link and store conditional instructions, such as those of the MIPS, Alpha, PowerPC, and ARM instruction set architectures, among others; the CAS2 double compare-and-swap instruction of the MOTOROLA m68k microprocessors (or, more generally, CAS-N instructions taking N arguments); transactional memory; memory-to-memory swap operations; or any other set of operations with infinite consensus number, as described in "Wait-Free Synchronization" in ACM Trans. Program. Lang. Syst. (January 1991) by Maurice Herlihy. The term "atomic conditional write instruction equivalent" is used herein to refer to an atomic compare-and-swap instruction or the above-listed instructions of equivalent expressive power. The atomic conditional write instruction equivalent is a transactional operation, in that concurrent accesses to the same memory cell by different processors do not result in objects being stored inconsistently (e.g., representations of two different objects being stored in the same cell).

In one embodiment, the representation written to the cell is a pointer to the object storage area 128, in which the object is located. In another embodiment, the representation written to the cell 126 is the object data itself if the data can be entirely represented within the amount of memory comprised by the cell, and a pointer to an external representation in the object storage area 128 otherwise. Note that writing a representation of the data itself, rather than a pointer to it, significantly reduces the amount of memory required. For example, if the processor pointer size is 8 bytes, and the cells 126 are each 8 bytes, storing an object of 8 bytes or less within the cells array 125 requires only one 8-byte cell, rather than one 8-byte cell for a pointer to the object and a separate block of memory in the object storage area 128 to store the pointed-to object itself.

Since processors may access the memory 120 in parallel, it is possible that another processor used its own atomic conditional write instruction equivalent to write into the cell 126 between the determination of step 220 and the issuing of the atomic conditional write instruction equivalent at step 230, and in such cases the atomic conditional write instruction equivalent of step 230 fails. If there was no such write operation by another processor, then the conditional write instruction succeeds.

Thus, it is determined 240 whether the conditional write instruction succeeded, thereby setting the cell to contain a representation of the object, or whether the conditional write instruction failed due to losing a race with another processor to write to it. If the write succeeded, then the cell contains a representation of the object, and the algorithm returns 260 the index of the cell 126.

If, however, the write from step 230 did not succeed, or if the test at step 220 determined that the cell at the current index position was not empty, then it is determined 250—e.g., by issuing non-atomic memory read and comparison instructions—whether the cell contains a representation of the object. The cell could contain a representation of the object put there by the current processor, or by another processor, before the test of step 220, or even possibly by another processor between the test of step 220 and the atomic conditional write attempt of step 230.

If the cell does in fact contain a representation of the object, then the index of the cell is returned 260. If it does not, then a next index is computed 270, which will be used to access another cell in the array. The next index may be generated using any deterministic function, such a simple incremental function that increments the index, a hashing algorithm, and so forth. With the new index computed, and thus a new cell 126 corresponding to the new index ready to be tested to see if it is empty or contains a representation of the object, the algorithm returns again to step 220, where the actions take place again as described above.

Thus, the dictionary management algorithm 136 iteratively computes indices of cells to examine until it either finds a cell that contains a representation of the object, or (presuming that some of the cells remain empty) it finds a cell in the empty state into which it successfully writes the representation of the object using the atomic conditional write instruction equivalent. Once this cell has been found, the algorithm returns the index of the cell. Returning the index of the cell 126 within the cells array 125, rather than a pointer to it, effects a significant memory savings in cases where the client code 140 using the object dictionary stores a large number of references to the various objects within it and where the number of cells in the cells array 125 is small enough that an index to one of the cells can be represented in fewer bits than a pointer. For example, if the processors 105 use 64-bit pointers and the cell array 125 has at most $2^{32}$ cells, then a cell can be referenced using a 32-bit index, rather than a 64-bit pointer, for a 50% memory savings. In cases in which there are hundreds of millions of these references, this level of savings results in a significant reduction in the amount of memory used to store the object references.

In one embodiment, the process 135 initially allocates enough memory for the cells array 125 so that it can be assumed that there will never be a need at runtime for more cells than are available. In another embodiment, the process 135 dynamically expands the size of the cells array 125 at runtime when some given percentage of the cells become allocated.

Note that the dictionary management algorithm 136 does not require a processor to acquire a lock on the cells array 125 before performing reads and writes on it. The only concurrency control employed is the use of one atomic conditional write instruction equivalent at step 230, which does not cause a processor to block. Additionally note that in the dictionary management algorithm 136, no cell that transitions from the empty state to an allocated state transitions back to the empty state again. The dictionary management algorithm 136 operates in a lock-free manner, i.e., guarantees system-wide progress in the interactions of the various processors 105 with the object dictionary 130. Progress is ensured due to the computation of the next index at step 270, which in essence eliminates one possible location for storing or locating an object and which can occur (for example) after an unsuccessful atomic conditional write at step 230. As a result, any process concurrently accessing the object dictionary 130 can crash, or be terminated, or be delayed arbitrarily long, and the data of the object dictionary will still be in a correct state.

A C-style pseudocode implementation of the algorithm described in FIG. 2 is shown below.

```
1    int compress(uintptr_t *cells, object_t *object) {
2        int i = hash(object) % length(cells);
3        uintptr_t new_value;
4        if (object_size(object) > MACHINE_PTR_BYTES)
5            new_value = (uintptr_t)object;
6        else
7            memcpy(&new_value, object, object_size(object));
8
9        while (true) {
10           if (compare_and_swap(cells[i], NULL, new_value))
11               return i;
12           if (object_equal(object, cells[i]))
13               return i;
14           i = nextProbe(i);
15       }
16   }
```

In the above pseudocode, the parameter cells is a pointer to the cells array 125, and the parameter object is a pointer to an object value to be searched for within the object dictionary 130 (and stored within it, if it is not already stored). The function hash( ) computes the hash value of object, the function length( ) computes the number of cells in the cells array 125, the function object_size( ) obtains the length of the given object in bytes, and the function nextProbe( ) calculates the next index to try in sequence after the current index, i.

As a first example of the operation of the pseudocode implementation of the algorithm, assume that the object being searched for within the cells array 125 is a name string "Goudge" (representing a last name). At line 2 of the above pseudocode, the compress function first computes a hash value based on the value of the name string using the hash function, hash, and assigns it as the initial value of index i. Lines 3-7 then set the new value to be located and/or stored based on the size of the name string object. Specifically, the test at line 4 compares the size of the name string object (including the null byte that terminates it) to the number of bytes that the processors 105 use to represent a pointer to a memory location (assumed for purposes of this example to be 64 bits, or 8 bytes). Since the string "Goudge," including its terminating null byte, only requires 7 bytes, which is less than the 8 bytes used by the hardware to represent a pointer, or by the cells array 125 to represent a cell, it can be stored inline within the cells array, and thus line 7 sets the new value to the value of the object, rather than a pointer to it.

The while loop at line 9 causes the function to continue to iterate until a representation of the name string is found in the cell array 125, or a cell in the empty state is found. At line 10, the atomic conditional write instruction, compare_and_swap, is used to conditionally write the value of the string "Goudge" into the cell if the cell is NULL. (The compare_and_swap instruction of this example returns a Boolean true value if it succeeds, and false if it fails.) If this conditional write succeeds, then the cell at index i now contains the string being searched for, and line 11 consequently returns i. If the compare_and_swap instruction fails, it is possible that the value "Goudge" is already stored in the cell, and thus line 12 tests whether this is the case, and if so consequently returns the index i at line 13. The test may be implemented by the processor's customary value-equality tests, which may not be atomic, such as a non-atomic memory read instruction in conjunction with a comparison instruction, for example.

If the value "Goudge" was not found at line 12, then at line 14 the function computes a new value for the index representing a next cell to try according to some deterministic sequence, and the while loop of line 9 repeats. The process will continue until a cell containing the string "Goudge" is found, or a cell in the empty state is found and "Goudge" is successfully written into it.

As a second example, if the longer name string "Elizabeth" (representing a first name) is being searched, the string cannot be stored within the 8 bytes used by the processors 105 of the example to represent a pointer to memory, and thus line 5 is executed to set new_value, the value to be located, to the pointer to the object, rather than the object value. Lines 9-14 then operate as discussed above, although new_value is then the pointer to the object rather than its value.

Note that the algorithm ensures a unique index for each distinct object, without scanning the entire cells array. The algorithm always considers the same sequence of cells for a given input object and terminates by inserting a representation of the object at the first free location. Since representations in cells are never deleted, if the compare-and-swap at line 10 ever succeeds, then the object was not previously present in the table. Concurrent insertions of the same object are resolved by the transactional power of compare-and-swap, which succeeds for exactly one inserter. Racing inserting processors see the object at line 12 and agree on the object's compressed representation. This uniqueness guarantee allows client code to compare compressed objects for equality by integer comparison.

In the case of string objects, the client code 140 calling the compress function and receiving the index i can determine whether the cell 126 at index i contains an inline representation of the string, or a pointer thereto, by examining the high byte of the cell. If it contains all zero bits—indicating either the null byte terminating the string, or a remaining portion of the NULL value initially stored in the cell to represent the empty state, then the cell contains an inline representation of the string. Otherwise, it contains a pointer to a string stored elsewhere in the memory 120. (To distinguish pointers to memory addresses with all-zero-bit high bytes from null-terminated strings, some non-zero bit code is written into the high byte before the address is stored in step 230, and then set back to zero before the pointer is dereferenced by the client code 140.) The client code 140 can refer to the string—e.g., to note that a particular friend with that name string posted a given message—by storing the index in an appropriate data structure. For example, a data structure representing a social network posting could include, in addition to data representing the posting, the name of the user that submitted the post as represented by the index of the user's name string token.

As noted, the object dictionary can be used by client code to save storage space where an object reoccurs throughout the application data. For example, client code might represent words within a document's content as indices to an object dictionary in which the words were stored. As another example, a three dimensional game could refer to a number of enemies of the same type using indices referring to a representation of the enemy type in the object dictionary. As yet another example, within a music sharing site, songs on a user's playlist could be represented as indices into an object dictionary storing the songs, and the playlists could be intersected with other users to determine a degree of affinity between the users.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A memory-based object dictionary comprising:
a linearly-addressed plurality of memory cells operatively coupled with a computer processor, wherein each memory cell is configured to store data representing one of:
an empty state indicating that no object has been stored within the cell, and
an allocated state indicating that a representation of an object has been stored within the cell; and
an executable program code that uses a single atomic conditional write instruction equivalent and a plurality of non-atomic instructions to transition one of the memory cells from the empty state to the allocated state, wherein the atomic conditional write instruction equivalent is implemented using at most two machine instructions of the computer processor.

2. The object dictionary of claim 1, wherein each memory cell is of a size of a pointer of the computer processor.

3. The object dictionary of claim 1, wherein the representation of the object of a cell in the allocated state comprises all the data of the object that it represents.

4. The object dictionary of claim 1, wherein the representation of the object of a cell in the allocated state comprises a pointer to the object that it represents.

5. A computer-implemented method comprising:
setting each of a linearly-addressed plurality of memory cells to represent one of:
an empty state indicating that no object has been stored within the cell, and
an allocated state indicating that a representation of an object has been stored within the cell; and
employing a single atomic conditional write instruction equivalent and a plurality of non-atomic instructions to transition one of the memory cells from the empty state to the allocated state, wherein no memory cell storing data representing the allocated state thereafter transitions to the empty state, and wherein the atomic conditional write instruction equivalent is implemented using at most two machine instructions of a computer processor.

6. The computer-implemented method of claim 5, wherein each memory cell is of a size of a pointer of the computer processor.

7. The computer-implemented method of claim 5, wherein the representation of the object of a cell in the allocated state comprises all the data of the object that it represents.

8. The computer-implemented method of claim 5, wherein the representation of the object of a cell in the allocated state comprises a pointer to the object that it represents.

9. The computer-implemented method claim 5, wherein the transition of the one of the memory cells from the empty state to the allocated state is lock-free.

10. The computer-implemented method claim 5, wherein the transition of the one of the memory cells from the empty state to the allocated state does not acquire a lock on all of the plurality of memory cells.

11. The computer-implemented method of claim 5, wherein the single atomic conditional write instruction equivalent never leads the computer processor to block.

12. A non-transitory computer-readable storage medium having executable computer program instructions embodied therein, actions of the computer program instructions comprising:
setting each of a linearly-addressed plurality of memory cells to represent one of:
an empty state indicating that no object has been stored within the cell, and
an allocated state indicating that a representation of an object has been stored within the cell; and
employing a single atomic conditional write instruction equivalent and a plurality of non-atomic instructions to transition one of the memory cells from the empty state to the allocated state, wherein the atomic conditional write instruction equivalent is implemented using at most two machine instructions of a computer processor.

13. The non-transitory computer-readable storage medium of claim 12, wherein each memory cell is of a size of a pointer of the computer processor.

14. The non-transitory computer-readable storage medium of claim 12, wherein the representation of the object of a cell in the allocated state comprises all the data of the object that it represents.

15. The non-transitory computer-readable storage medium of claim 12, wherein the representation of the object of a cell in the allocated state comprises a pointer to the object that it represents.

16. The non-transitory computer-readable storage medium of claim 12, wherein the transition of the one of the memory cells from the empty state to the allocated state is lock-free.

17. The non-transitory computer-readable storage medium of claim 12, wherein the transition of the one of the memory cells from the empty state to the allocated state does not acquire a lock on all of the plurality of memory cells.

18. The non-transitory computer-readable storage medium of claim 12, wherein the single atomic conditional write instruction equivalent never leads the computer processor to block.

\* \* \* \* \*